Figure 2:
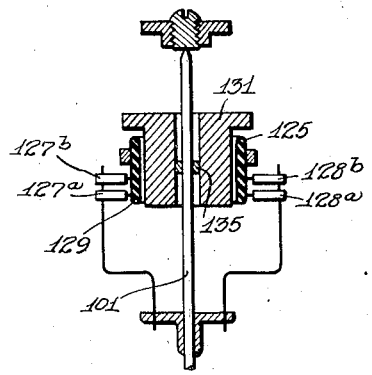

March 28, 1939. A. PATIN 2,151,793
POSITIONAL RECEIVER
Filed July 15, 1936

Inventor:
ALBERT PATIN
Edward H. Palmer

Patented Mar. 28, 1939

2,151,793

UNITED STATES PATENT OFFICE 2,151,793

POSITIONAL RECEIVER

Albert Patin, Berlin, Germany

Application July 15, 1936, Serial No. 90,810
In Germany May 13, 1933

4 Claims. (Cl. 172—239)

This invention relates to improvements in receivers of the kind used in transmission-systems for angular motions or positions. More particularly, my invention relates to annular potentiometer resistances for receivers of this kind.

Transmission-systems serving for the transmission of angular motions or positions having receivers constructed in accordance with this invention can be used with advantage in a great variety of applications. They are used for example in the measuring art to transmit and reproduce at a distant point the indications of a measuring instrument. They are particularly useful for the distant indications of compass readings on ships and aircraft, as it is often impracticable to locate the compass at that point where its indications are needed. It is well known that the accuracy of compass indications may be seriously impaired where considerable masses of iron are in the vicinity of the compass or where electrical conductors pass near the compass. In aircraft, therefore, particularly, it is much preferable in order that the compass readings may be correct to locate the compass itself at a point as remote as possible from the engine with its great bulk of metal, said point being located for example in the tail of the aircraft, while a compass card controlled by said compass is mounted on the instrument board in front of the pilot's seat, so that the pilot can steer his machine according to the compass readings or indications.

Systems for the transmission of angular motions or positions provided with a receiver constructed in accordance with this invention are also useful in the case of horizon or azimuth gyroscopes, which also require that angular or rotary movement be reproduced at a distance. In order that the instrument board may be embraced at a glance it must be made as small and compact as possible, particularly in the pilot's compartment of aircraft in order that the pilot may have a comprehensive view of the numerous measuring instruments on said board. The location of such measuring instruments themselves upon said boards represents a serious difficulty however, because it is necessary that sufficient space be provided behind the instrument board for the casings containing said instruments. In the case of gyroscopic apparatus it may also be preferable in many instances that the instrument itself be located at some point other than the instrument board, for example nearer the source of the driving energy for the gyroscope. For such and similar cases of application, a system of transmission of angular motions or positions having a receiver constructed in accordance with this invention will be considerably more advantageous and useful, as compared with systems using receivers heretofore known and used for this purpose. When using the receiver forming part of this invention, angular motions or positions may be transmitted up to any desired angle, angles of any desired multiples of 360° being faithfully transmitted and reproduced at a distance, whether the rotation be clockwise or contraclockwise. In the drawing I have shown, besides a preferred exemplification of my new receiver, also a diagram of connections for the same for faithful and exact transmission of the angle of said motions or positions. With this mode of application of my new receiver compensating connections are used for the transmission-system to operate according to the so-called zero-method. The receiver, however, may also be used with other modes of connections, for instance with a bridge-connection, in which case it is always of advantage, although not necessary, to arrange said connection in a manner to operate according to the zero-method.

One object of my invention consists in equipping a receiver with an annular potentiometer resistance closed upon itself and with two or more contact-members sliding thereon, each of said contact members being electrically connected with a coil, said two or more coils being arranged rotatably within a magnetic field. The rotatable coils are so coupled with the annular resistance and the contact-members sliding thereon that a rotation of the coils in the magnet system will cause an adjustment of said contact members with respect to said annular potentiometer resistance. The coils themselves are spaced with respect to each other, the same as said contact-members, through an angle different from the pole-pitch. In consequence of this, the rotating system of the receiver will continue to rotate, and more particularly clockwise or contraclockwise, as long as a current flows through said coils in the one or other direction. Owing to the fact that in my invention the angular spacing of the planes of said coils from each other is different from the pole-pitch, a torque will always be exerted in my novel receiver on the rotatable system, whenever there is a flow of current. For, if one of the coils should be positioned in the neutral zone of the magnetic field so that no torque is exerted on this coil, the other coil will certainly be positioned outside of said neutral zone, due to the said angular spacing of the coils, so that a torque will be exerted under all circumstances on the other coil, or in case several coils are used, also onto the several other coils.

Another object of the invention resides in the fact that the moving coils in the receiver are so arranged and connected that they simultaneously exert a torque in the same direction upon the shaft of the receiver either clockwise or contraclockwise.

Another object of the invention resides in providing an extremely advantageous and convenient annular potentiometer resistance in the receiver, said resistance comprising a thin wire of precious metal wound from the inside outwardly upon a very thin walled cylinder of insulating material, such as artificial resinous material, "Bakelite" or the like, in such manner that the resistance wire extends substantially parallel to the axis of the cylinder.

Another object of the invention is to provide a construction in which the cylinder just referred to is slipped over a cylindrical core which may serve also accurately to center the shaft relatively to the resistance wire-windings about which the tapping means or contacts rotate. In such case said core may consist of a metal cylinder in order to further the escape of heat, said metal cylinder being covered by a very thin covering of insulating material.

A further object of the invention consists in the fact that, if necessary, the movable parts of the receiver will be embedded together with the annular potentiometer resistance in an insulating liquid having good heat-conducting properties, for instance in a bath of petroleum.

In the case of the hollow cylinder above referred to the ratio of diameter of the cylinder to its wall thickness will preferably be less than 1 to 10, as otherwise there is danger that owing to the too great disparity between the inner and outer circumference of the cylinder it may be difficult to wind the resistance wire on the cylinder in the uniformly spaced windings desired.

Where said cylinder is slipped over a cylindrical core, as above referred to, said core may, in accordance with the invention, also serve as a journal for the rotary part in the transmitter or the receiver. This provides an effective centering of the current tapping means or contacts relatively to the resistance ring upon which said contacts slide, so that errors in the angular transmission due to eccentricity which might cause defective distribution of the resistance ratios by the sliding contacts, are avoided. The shaft carrying said rotary part may in this case be provided with pivots engaging bearing stones, cap-screws or the like inserted in the central bore in the resistance cylinder core.

A further object of the invention consists in making the annular potentiometer resistance of resistance-wire drawn out of non-corrosive steel, for instance of V2a-steel. Non-corrosive steel is especially advantageous as a material for the resistance-wire, because a wire of this material is highly resistant against corrosion and will not be attacked, even in case of permanent operation, by the action of the current passing between the contact-members having the form of sliding brushes and the resistance-wire.

A wire of this kind, moreover, is possessed of a relatively very high co-efficient of resistance and, in addition, may easily be drawn in such a manner that the co-efficient of resistance will remain constant with sufficient accuracy throughout the entire length of the wire, while wires of alloys of precious metals can generally not be made to present a proper uniformity of the co-efficient of resistance throughout their length, and besides are possessed of a lower co-efficient of resistance. A high co-efficient of resistance, however, affords the advantage that relatively great variations in the resistance at a time included between the contact-members on the potentiometer may be attained by very small displacements or spacing of said contact-members, the precision of the apparatus being thus essentially increased.

Other objects of the invention will appear from the following description.

The invention will be clearly understood from the following description, taken in connection with the accompanying drawing, of illustrative apparatus embodying the features of the invention, the true scope of the invention being more particularly pointed out in the appended claims.

Figure 1:
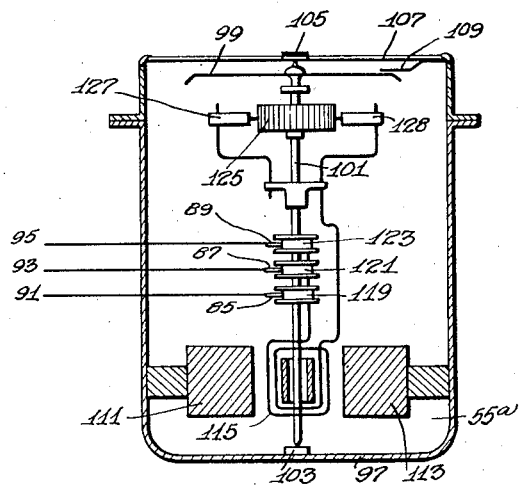
Figure 1:
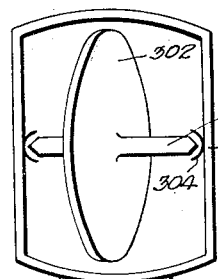
Figure 3:
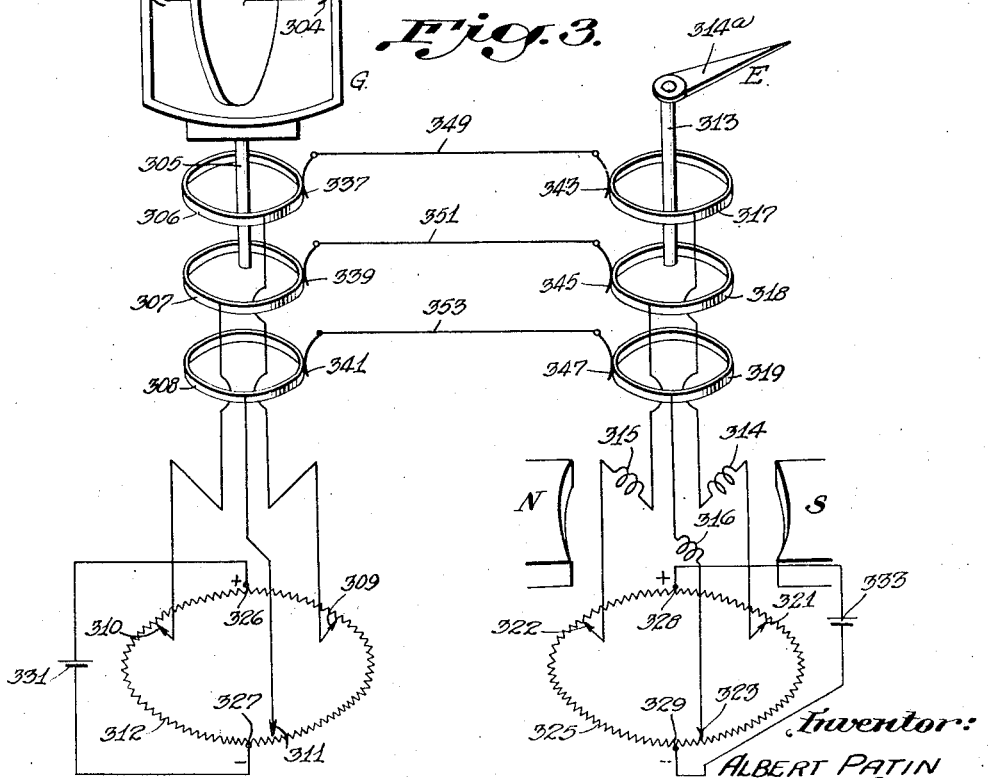

In the drawing, I have shown in Fig. 1 in a vertical section a construction of my new receiver, the coils being indicated only diagrammatically for the sake of clearness, while Fig. 2 shows in a vertical partial section the annular potentiometer resistance together with the contact-members thereon forming part of the receiver. Fig. 3 is a diagram showing the connections for the new receiver as used in an electrical system of transmission in which the indication of an azimuth gyroscope indicating the direction of travel of an aircraft is transmitted to some distant point, for instance to the instrument board. In this case the transmitter connected with the gyroscope is likewise shown diagrammatically.

As the transmitter itself as well as the entire system of transmission does not form part of my present invention, a more exact representation of these parts may be dispensed with.

The receiver as shown in Fig. 1 comprises a casing 97, in which a spindle 101 carrying a compass card 99 is mounted by means of a pivot suspension 103, 105. The upper pivot bearing 105 will preferably be provided in a glass plate 107 which closes said casing 97 at the top and through which said compass card and the steering or lubber's line 109 can be observed. Within said casing 97 a magnet with pole-shoes 111, 113 is mounted to create a fixed magnetic field. The spindle 101 carries three coils spaced 120° apart, of which only one, numbered 115, is shown for the sake of simplicity. Said coils are connected on the one hand with slip rings 119, 121 and 123 carried by said spindle 101 and on the other hand with three brushes, respectively, which engage the potentiometer resistance 125 in the form of a closed circle, only two of said brushes, namely, 127 and 128, being shown for the sake of simplicity. Slip rings 119, 121, 123 on said spindle 101 are engaged by brushes 85, 87 and 89, respectively.

Fig. 2 serves to supplement the representation of the new receiver shown in Fig. 1, the construction of the annular potentiometer resistance 125 being represented in Fig. 2 together with several preferred special constructions, the compass card 99 carried by the spindle 101 being omitted from said figure. Said spindle also carries two sets of three brushes of which only two of each set are shown, namely, 127a, 127b and 128a, 128b. The other parts carried by said spindle are also omitted for simplicity. The potentiometer resistance wire 125 is wound upon the insulation ring 129 as described, said ring being preferably made of artificial resin or Bakelite. Said ring will preferably have a sliding fit upon a hollow core 131 in order to prevent deformation of said ring, and said core will preferably be made of metal to facilitate the escape of heat and will be covered with a thin insulating layer upon its peripheral surface. The bore 135 of said core facilitates centering of the spindle 101. Said bore may also receive the bearings for said spindle. An accurate centering of said spindle 101 is essential, as only in such case will the same angular rotation of said spindles produce the same variation in the current taken from said resistances, upon which depends in the highest degree the accuracy of transmission of the angular movement.

As in Fig. 1 so also in Fig 2 the spindle 101 will faithfully reproduce the rotation or angular moment of the transmitter spindle.

Fig. 3 shows an example of a suitable scheme of connections for using the new receiver to exactly indicate angular motions at a distant point. In this case an azimuth gyroscope is assumed to act as transmitter, that is to say, a gyroscopic apparatus having a horizontal axis and three degrees of free motion, said apparatus comprising a frame rotatable about a vertical axis, in which frame the gyroscope proper is suspended by means of a Cardan joint, said frame retaining its initial direction as long as the gyroscope is rotating, thus being able to serve for indicating the azimuth direction, that is the direction of travel of an aircraft. The gyroscopic apparatus as a whole is preferably mounted at a suitable place of the aircraft, for instance in the tail of the latter, while the receiver which indicates the motion of the gyroscope frame relatively to the aircraft and therewith to the direction of travel of the latter may be mounted together with other instruments on the instrument board. Arranging the receiver in this manner is especially advantageous for the reason that a great number of different instruments must be united on the instrument board to permit proper inspection thereof, and that a space sufficient for the mounting of the relatively large gyroscopic apparatus can only be provided with difficulty. In addition to this, it is frequently of advantage to connect the gyroscope itself with a magnet compass to rectify deviations which may eventually arise and to place the compass as much as possible at a distance from iron masses liable to exert a disturbing action on the compass.

For the sake of clearness in Fig. 3 the receiver as well as the transmitter are represented diagrammatically, all parts not necessarily required for the understanding of the operation being omitted.

According to Fig. 3 the transmitter G consists of a gyroscope 302 rotating in the vertical frame 301. The spindle 303 of the gyroscope is mounted in a bearing provided in the horizontal frame 304 which is suspended in the vertical frame 301 to be swingable about an axis perpendicular to the axis 303 of the gyroscope, that is about a horizontal axis not shown in the drawing. The vertical frame 301 on its part is fixed to the rotatable vertical spindle 305 which on its part is mounted in bearings provided in the casing (not shown) of the transmitter. Fixed to the spindle 305 are three slip-rings 306, 307, 308 which are conductively connected with the contact-members 309, 310, 311, respectively, of the transmitter. These contact-members are likewise fixed to the spindle 305 and so arranged that they have a sliding contact with the annular potentiometer resistance 312 at three points spaced exactly 120° from each other.

The receiver comprises a magnet having pole-shoes N and S creating a magnetic field, and a spindle 313 which carries a pointer 314a, or instead thereof a compass-card, faithfully to indicate the angular movements of the vertical frame 301 of the transmitter. In accordance with the form of construction of the receiver described and shown in Figs. 1 and 2, the spindle 313 carries the three coils 314, 315, 316 electrically connected each with one of its terminals to one of the slip-rings 317, 318 and 319 on the spindle 313. Besides, the coils 314, 315, 316 are connected each with the other of its terminals with the contact-members 321, 322, 323, respectively, said contact-members on their part sliding on the angular potentiometer resistance 325 in such a manner that they contact with said resistance at three points also spaced from each other exactly by 120 degrees. The pole-pitch of the magnetic field N, S, therefore, differs from the angle by which the coils 314, 315 and 316 are spaced with respect to each other. Current is supplied to the annular potentiometer resistance 312 of the transmitter as well as to the potentiometer resistance 325 of the receiver at two points 326, 327 and 328, 329, respectively, said points on either resistance 312 and 325 being spaced from each other by 180°. It is important that exactly the same difference of voltage shall exist between the points of either pair which may be attained by using batteries of like voltage or if current is supplied from some other source of electric energy a voltage stabilizer may be used for this purpose. Such batteries are indicated, one at 331 for the transmitter, and one at 333 for the receiver. The batteries are connected with each other at one pole thereof. The brushes 337, 339 and 341 have sliding contact with the slip-rings 306, 307, 308, respectively, said brushes being fixed on the casing but insulated therefrom, while brushes 343, 345, 347 are sliding on the slip-rings 317, 318, 319 of the receiver, said brushes being likewise fixed on the casing of the receiver but insulated therefrom.

The three pairs of brushes 337, 343 and 339, 345 and 341, 347 are connected with each other by leads 349, 351, 353.

The mode of operation of the apparatus shown in Fig. 3 is as follows:

If the vertical frame 301 of the transmitter and the pointer 314a of the receiver and accordingly the spindles 305 and 313 of the transmitter and of the receiver assume such a position that the points of contact 309, 310, 311 between the brushes sliding on the annular potentiometer resistance 312 in the transmitter and the points of contact of the contact members 321, 322, 323 sliding on the annular potentiometer resistance 325 in the receiver are distanced each from the current supply points 326, 327 or 328, 329 an even angle, no difference in the voltage will exist between the points 309, 321 or 310, 322 or 311, 323, as the same voltage prevails at the current supply points 326 and 328 or 327 and 329. This is due to the fact that as a result of the like angles between the contact-members 309, 310, 311 or 321, 322, 323 in the transmitter as well as in the receiver, the contact-members will include like resistance values, figured from the current supply points, and in consequence thereof no current can flow past the point 309, slip-ring 306, brush 337, lead 349, brush 343, slip-ring 317, coil 314, contact-member 321, that is to say no current can flow through the coil 314. For the same reason no current can flow through the two other coils 315, 316 of the receiver, so that no torque whatever will be exerted on these coils and on the spindle 313 of the receiver. The pointer 314a or, as the case may be, the compass card will therefore remain at rest.

If, however, the vertical frame 301 of the transmitter is displaced, for instance owing to the aircraft assuming a turning motion, the contact-members 309, 310, 311 on the annular potentiometer resistance 312 will be displaced. However, as now the angular distance between the contact-points of the contact-members and the current-supply points 326, 327 and the resistance values included in the receiver are different from those of the transmitter, there will be produced a difference of voltage between the contact-points and the contact-members 309, 321 or 310, 322, 311 or 323 in the transmitter and the receiver so that now a current flows through the coils 314, 315 and 316. Since, on account of the angular displacement between the coils which is different from the pole-pitch, the coils will never be positioned simultaneously in the neutral zone of the magnetic field N, S in the receiver, there will be exerted under all circumstances a torque on at least two of the coils, said torque effecting a rotation of the axle 313 and therewith a deflection of the pointer 314a. By this rotation now the position of the contact-points at which the contact-members 321, 322, 323 are contacting with the annular potentiometer resistance 325 will be changed so that the resistance values are varied accordingly at this place. More particularly, this variation takes place with properly wound coils 314, 315 and 316 in full agreement with the displacement of the frame 301 of the transmitter and of the brushes on the transmitter potentiometer resistance 312. By this now the voltages taken off the contact points of the receiver potentiometer resistance will approach the voltages taken off at the contact points of the transmitter potentiometer as soon as said former voltages have become equal to the latter, that is as soon as the spindle 313 of the receiver has performed the same rotation as the spindle 305 of the transmitter. Thus, there will also be established like voltages between the contact points in the transmitter and those in the receiver. The current which previously had been flowing through the coils 314, 315 and 316 of the receiver past the connecting leads 349, 351, 353 will now be reduced to zero with the result that motion of the receiver spindle 313 will come to standstill. In consequence of this, at the pointer 314a or, as the case may be, at the compass card forming part of the receiver, there will exactly be reproduced and indicated the angular motion of the transmitter.

For simplicity, each of the annular resistances 312 and 325 is herein shown as closed upon itself, in other words as an unbroken annulus. A broken annulus could be used, however, without departing from the spirit and scope of the invention. The apparatus will operate equally well if, instead of an unbroken annular resistance, a broken one were used, an annulus, for example, which were broken at substantially that point where a contact member 309, 310, 311 in the transmitter, or a contact member 321, 322, 323 in the receiver, would be when the corresponding receiving coil 314 or 315 or 316 passes through the neutral zone of the magnetic field. As there are two such diametrically opposed points on each of the two annular resistances, the annular resistance could consist of two semi-circular parts having their ends out of contact. This result is due to the fact that as a coil passes through said points, it receives but a slight rotary moment, so that in a two-coil receiver structure the second coil, and in a three-coil receiver structure the other two coils, receive a sufficient rotary moment or impulse to carry the rotary receiver system over said point.

The new receiver forming part of this invention, however, is not limited in its mode of application to a transmission of the angular motion or position of azimuth gyroscopes and may as well be used for distant indication in the form of a secondary compass or for the transmission of other angular motions or positions, for instance in connection with bridge-deck transmission systems or the like. The mode of application of the new receiver is likewise in no way confined to the apparatus connected up in the manner described herein or shown in the drawing. Bridge connections and other connections operating according to the zero-method may likewise be used, if the transmitter is properly constructed. The construction of the receiver may also be varied in many ways without departing from the scope of the principles of my invention. Thus, for instance, the annular potentiometer resistance, instead of being fixed, may be made to rotate with the respective axle, while the contact-members, instead of being rotatable, may be fixed, without departing from the spirit of my invention or sacrificing any of its advantages. In the appended claims I have endeavored to define the scope of my present invention.

I claim:

1. A receiver for faithful transmission of angular positions or motions, said receiver consisting of a casing; means for producing a fixed magnetic field in said casing; an annular resistance closed upon itself and arranged fixedly in said casing; a spindle rotatably mounted in said casing; said spindle being centrally directed with respect to said annular resistance; at least two coils fixed to said spindle, said coils being mounted rotatably in said magnetic field and the angular spacing of said coils from one another differing from the pole-pitch of said magnetic field; contact-members fixed to said spindle, said contact-members sliding on said annular resistance, each of said contact-members being connected with one terminal of said coils; and means for supplying current to the other terminals of said coils.

2. A receiver for faithful transmission of angular positions or motions, said receiver comprising a casing; means for producing a fixed magnetic field in said casing; an annular resistance fixedly mounted in said casing; a spindle rotatably mounted in said casing, said spindle being centrally directed with respect to said annular resistance; at least two coils fixed to said spindle, said coils being rotatably mounted in said magnetic field and the angular spacing of said coils from one another differing from the pole-pitch of said magnetic field; contact-members fixed to said spindle and adapted to slide on said annular resistance, each of said contact-members being connected to one terminal of said coils; and means for supplying current to the other terminals of said coils.

3. A receiver for faithful transmission of angular positions or motions, said receiver comprising a casing; means for producing a fixed magnetic field in said casing; an annular resistance fixedly mounted in said casing; a spindle rotatably mounted in said casing, said spindle being centrally directed with respect to said annular resistance; a plurality of coils fixed to said spindle, said coils being rotatably mounted in said magnetic field and their angular spacing from one another differing from the pole-pitch of said magnetic field; contact-members fixed to said spindle and adapted to slide on said annular resistance, each of said contact-members being connected to one terminal of said coils; and means for supplying current to the other terminals of said coils.

4. A receiver for faithful transmission of angular positions or motions, said receiver comprising a casing; means for producing a fixed magnetic field in said casing; an annular resistance fixedly mounted in said casing; a spindle rotatably mounted in said casing, said spindle being centrally directed with respect to said annular resistance; three coils of equal angular spacing from one another fixed to said spindle, said coils being rotatably mounted in said magnetic field and their angular spacing from one another differing from the pole-pitch of said magnetic field; contact-members fixed to said spindle and adapted to slide on said annular resistance, each of said contact-members being connected to one terminal of said coils; and means for supplying current to the other terminals of said coils.

ALBERT PATIN.